United States Patent
Rankin et al.

(10) Patent No.: US 6,915,370 B2
(45) Date of Patent: Jul. 5, 2005

(54) DOMAIN PARTITIONING IN A MULTI-NODE SYSTEM

(75) Inventors: Linda J. Rankin, Portland, OR (US); Kai Cheng, Portland, OR (US)

(73) Assignee: Intel Corporation, Santa Clara, CA (US)

(*) Notice: Subject to any disclaimer, the term of this patent is extended or adjusted under 35 U.S.C. 154(b) by 472 days.

(21) Appl. No.: 10/029,554

(22) Filed: Dec. 20, 2001

(65) Prior Publication Data

US 2003/0120853 A1 Jun. 26, 2003

(51) Int. Cl.[7] .............................................. G06F 13/00
(52) U.S. Cl. ..................... 710/305; 370/395.31
(58) Field of Search ............................... 710/305, 306, 710/316; 370/395.31; 709/203

(56) References Cited

U.S. PATENT DOCUMENTS

| | | | |
|---|---|---|---|
| 5,566,171 A | * | 10/1996 | Levinson ..................... 370/352 |
| 2003/0005200 A1 | * | 1/2003 | Kumar et al. ................ 710/302 |
| 2003/0007493 A1 | * | 1/2003 | Oi et al. .................. 370/395.31 |
| 2003/0061538 A1 | * | 3/2003 | Kane et al. ..................... 714/24 |

FOREIGN PATENT DOCUMENTS

EP      0 848 327 A2 *  6/1998   ............. G06F/9/46

OTHER PUBLICATIONS

U.S. Appl. No. 60/302,226, filed Jun. 28, 2001.*

* cited by examiner

Primary Examiner—Glenn A. Auve
(74) Attorney, Agent, or Firm—Fish & Richardson P.C.

(57) ABSTRACT

A multi-port switch is incorporated into a multi-node computer system and at least a first port of the multi-port switch is assigned to a first domain.

23 Claims, 6 Drawing Sheets

Fig. 6

DOMAIN PARTITIONING IN A MULTI-NODE SYSTEM

TECHNICAL FIELD

This invention relates to domain partitioning.

BACKGROUND

Figure 1:
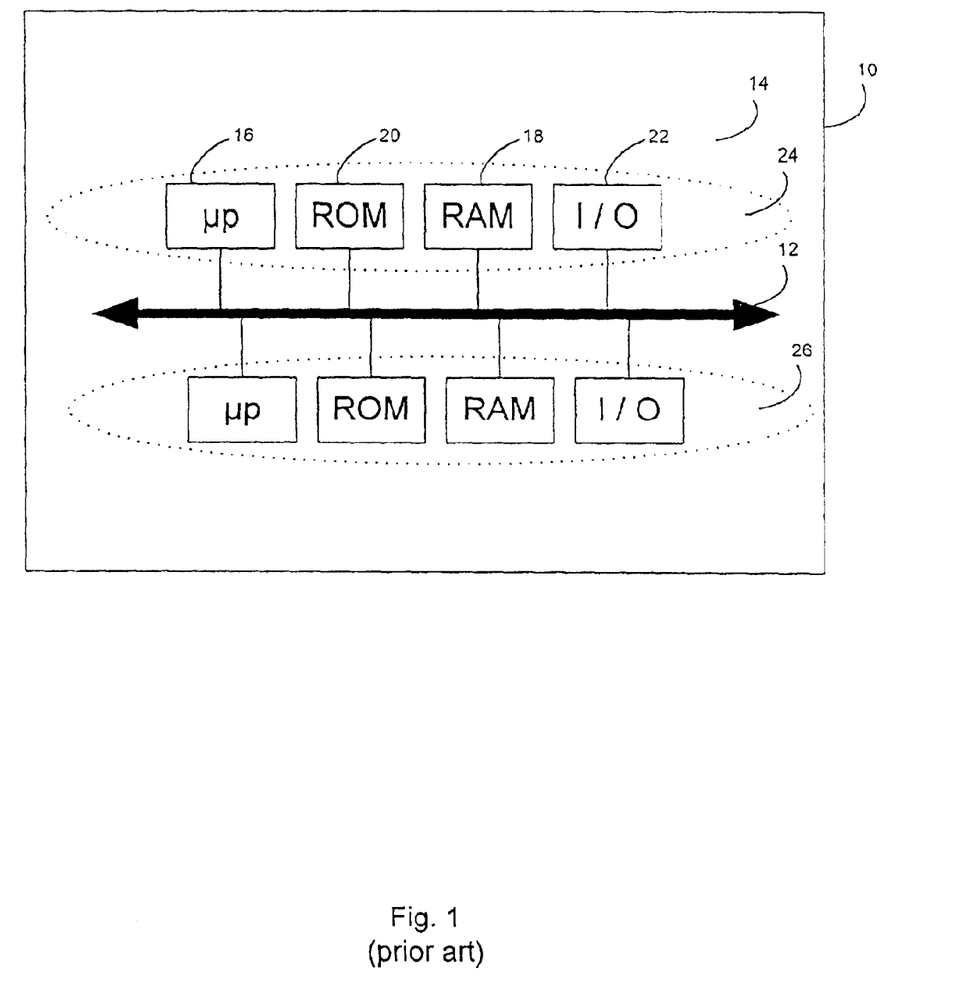
FIGS. 1 and 2 show prior art computer systems.

A personal computer, such as the computer 10 shown in FIG. 1, typically uses a bus 12 to connect components or nodes 14, such as processor nodes 16, memory nodes 18 and 20, and I/O nodes 22. Because the bus provides only one path for transactions among the nodes, requests by nodes to engage in multiple transactions at one time are queued, causing delay in the completion of some transactions.

Sometimes it is advantageous to divide a single computer 10 into multiple domains (or logical computers) 24 and 26. This is known as domain partitioning. In a bus-based computer 10, domain partitioning is accomplished through addressing. For example, if the nodes 14 of system 10 use an eight bit addressing scheme (for a maximum total of 256 nodes) and computer 10 is being divided into two domains, the highest order bit can be used to denote the domain. For example, all nodes belonging to domain 1 would have addresses following the pattern 0??????? and all nodes belonging to domain 2 would have addresses following the pattern 1???????.

Figure 2:
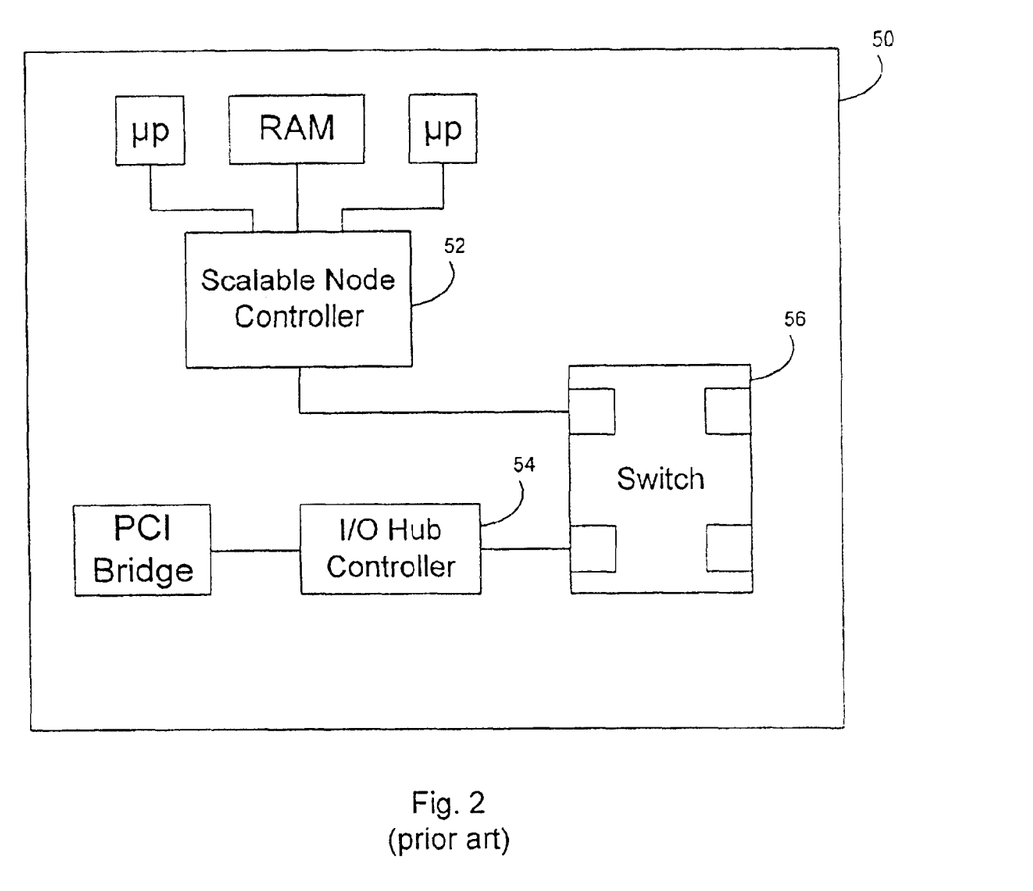

Some computers used as servers or high-end workstations, such as the computer 50 shown in FIG. 2, do not use a bus for transactions among nodes. Instead a switch 56 connects nodes such as scalable node controller 52 and I/O hub controller 54. Switch 56 may be a cross bar switch or a router, for example. The switch enables the nodes to be connected dynamically on multiple paths. Enough paths can be provided to connect all nodes simultaneously. Delays are reduced and large blocks of data can be transferred.

DETAILED DESCRIPTION

Figure 3:
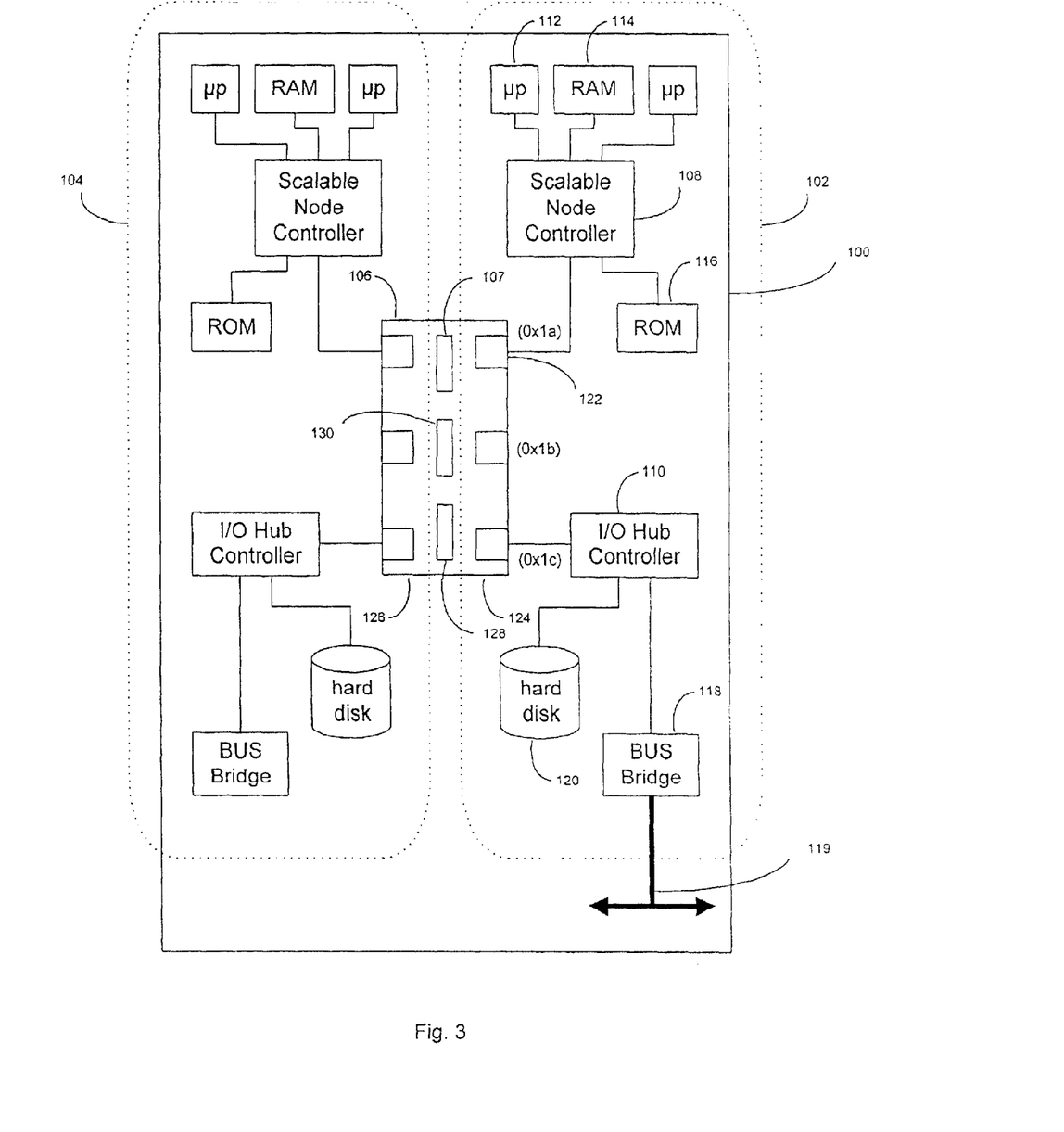
FIG. 3 shows a domain partitioning process.

Referring to FIG. 3, a multi-domain computer system, workstation, or server, such as computer system 100, includes more than one logical domain 102 and 104. Switch 106 is connected to each domain and enables transactions to be conducted within each domain. More than two domains can be provided if needed.

Switch 106 is a multi-port device that is used to connect the nodes of computer system 100 and establish a communication link between them. During use, switch 106 receives transactions (e.g., data packets, commands, error signals, or any other network traffic) on one or more or its ports and transmits these transactions to their intended recipient. Each node connected to a port has a unique node ID and each port of switch 106 has a unique port address. Switch 106 utilizes a routing table (not shown) that specifies which nodes are connected to which ports. Therefore, when a transaction is received that is addressed to a specific node, switch 106 uses its routing table to determine which port to transmit the transaction on.

In addition to these addressed transaction transfers, transactions may also be simultaneously broadcast on all ports and, therefore, to all nodes in system 100.

Concerning the domains of system 100, each domain is essentially a unique, self-sufficient computer system that includes its own processor node(s), storage node(s), memory node(s), and I/O node(s), and runs its own instance of an operating system. Partitioning the computer system 100 into multiple domains provides a degree of built-in redundancy. For example, domain 104 can be configured as a redundant system which becomes the primary domain if domain 102 fails. Or the second domain 104 could serve as a test bed for new software prior to installing the new software on the first domain 102 of the system 100. This arrangement enables continuous operation of and maximum uptime for a server, for example. By design, domains 102 and 104 typically do not interact and transactions are not conducted between them, as this reduces the possibility of a problem associated with one domain affecting the operation or performance of the other domain.

Each domain 102, 104 includes one or more scalable node controllers 108 and one or more I/O hub controllers 110. A scalable node controller 108 connects one or more microprocessors 112, system RAM 114, and system ROM 116 to switch 106. An I/O hub controller 110 connects input/output devices, such as bus bridges 118 and hard disks 120 to switch 106. Additionally, system ROM 116 may be connected to I/O hub controller 110 instead of (or in addition) to scalable node controller 108. Bus bridge 118 may be a Peripheral Component Interconnect (PCI) bridge, a Small Computer System Interface (SCSI) bridge, or an Industry Standard Architecture (ISA) bridge, for example. These bus bridges 118 allow for the interfacing of the multi-domain computer system 100 (which incorporates switch topology) and a standard communication bus 119, thus allowing a switch-based system to use a standard communication bus to communicate with card-based peripherals (e.g., video cards, network adapters, or modems). Switch 106 can be a cross bar switch, or a router, for example.

In a multi-domain computer system 100, switch 106 defines the number and configuration of the domains. Specifically, switch 106 may include six addressable ports 122, but the actual number of ports will depend on the design and complexity of the computer system 100.

Ports 122 are used to interconnect the components of the system (e.g., scalable node controllers 108, and I/O hub controllers 110), in that each device is connected to a port 122 on switch 106, and each of the controllers can couple the devices that it controls to the port. Switch 106 assigns each port to a domain. For example, in FIG. 3, switch 106 contains a right bank 124 of three ports (assigned to a first domain 102) and a left bank 126 of three ports (assigned to a second domain 104).

A port assignment device/process 107 (incorporated into switch 106) allows each port of switch 106 to be assigned to a domain. This port assignment device/process 107 can take various forms. For example, port assignment device/process 107 may allow for manual configuration of domains, in that a set of jumpers or DIP switches (not shown) for each port may be included to allow the administrator of system 100 to assign each port to a domain. Alternatively, port assignment device/process 107 may allow for electronic configuration of domains, in that switch 106 specifically or system 100 generally may contain firmware (e.g., ROM) that enables the administrator of system 100 to assign each port of switch 106 to a domain.

Once the administrator assigns a set of ports to a domain, the ports (and the nodes attached to it) function as an independent machine capable of processing data independently of the activities of other domains in the system. Accordingly, any transactions (e.g., data packets, commands, error signals, or any other network traffic) received on a port assigned to a specific domain will be available only to those other ports assigned to that same domain, unless the switch is operated to permit them to be communicated to another of the domains. Transactions received on a port assigned to one domain are routed to the other ports assigned to that domain; transactions received on a port assigned to a second domain are routed to the other ports assigned to that second domain; transactions received on a port assigned to a third domain are routed to the other ports assigned to that third domain; and so forth. As these domains function independently, a hardware failure (with the exception of the switch itself) or a software failure on one domain will not interfere with the operation or functionality of the other domain(s).

Because each port in switch 106 has a unique port address, the header of a data packet may include port address information, thus allowing for the routing of individual packets to individual ports.

As stated above, switch 106 can perform broadcast transactions, in that a single transaction can be broadcast over all ports simultaneously. Since switch 106 is capable of being partitioned into multiple domains, any broadcast transaction generated within a specific domain of switch 106 should only be transmitted to those ports assigned to that domain. Accordingly, switch 106 includes a broadcast partitioning process 128 for monitoring broadcast transaction generated for a specific domain and only transmitting those transactions to the node devices attached to the ports assigned to that domain.

To increase memory access speed, computer systems typically incorporate cache memory. Cache memory is random access memory that the microprocessor of a computer system can access more quickly than standard system memory. Cache memory is typically static RAM, which allows for quicker access than the dynamic RAM from which system memories are constructed. Cache memory can either be incorporated into the microprocessor itself or located proximate the microprocessor. Cache memory functions by copying selected portions of the "slower" system memory into the "quicker" cache memory. Therefore, the portions of memory that are repeatedly accessed by the microprocessor are copied from the system memory into cache memory, thus increasing the overall processing speed of the microprocessor.

Switch 106 includes a domain cache coherency process 130 (typically referred to as "snoop logic") for maintaining the coherency of the cache memory for each domain. As stated above, each domain 102 and 104 of computer system 100 includes numerous nodes, to which multiple processors may be connected. Therefore, it is possible for multiple processors (or other nodes) to simultaneously cache the content of a single memory address space in system memory. If this simultaneous caching occurs and one of these nodes or processors overwrites the content of that memory address space (by either overwriting the content of their cache memory or overwriting the content of the system memory), the copy cached by the other node device must to be updated to reflect that change and maintain cache coherency. This cache coherency is maintained by the domain cache coherency process 130 which monitors the caching of memory address spaces by the various nodes of the system 100. In the event that the content of a node's cache memory is changed and the system memory is updated to reflect that change, domain cache coherency process 130 informs the node requiring the update that the content of the system memory they have cached has changed. This node will then update the content of their cache memory to reflect that change.

As stated above, system 100 is divided into multiple independent domains and each domain has a separate and independent memory structure. Accordingly, the content of memory at a specific memory address in a first domain is likely different than the content of memory at the same specific memory address in a second domain. Therefore, domain cache coherency process 130 maintains memory coherency within the individual domains, regardless of the content of memory address spaces in the other domains. This can be accomplished in a couple of ways.

A separate domain cache coherency process 130 can be used for each domain. Therefore, each domain cache coherency process is domain-specific, as each process only monitors the caching of memory within its own domain.

Alternatively, domain cache coherency process 130 may monitor all memory caching that occurs on system 100 (as opposed to domain-specific caching). If domain cache coherency process 130 is configured to operate in this fashion, each caching operation monitored within system 100 is assigned a domain identifier, specifying which domain the node performing the caching function belonged to. Therefore, while a single domain cache coherency process 130 is used for all domains of system 100, process 130 monitors the caching operations on a "per domain" basis and, therefore, maintains the coherency of each domain's memory structure independently.

Figure 4:
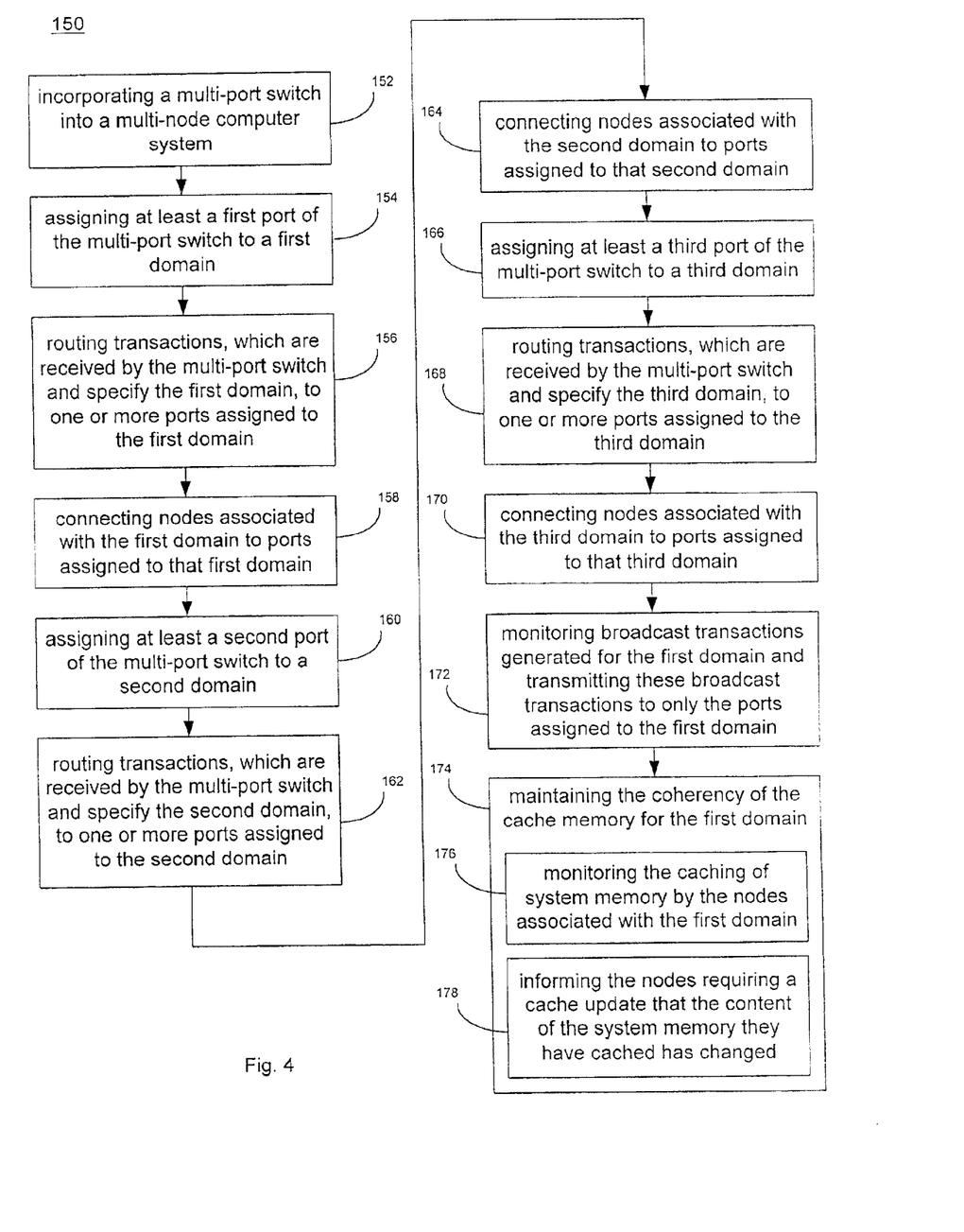
FIG. 4 shows a domain partitioning method.

Referring to FIG. 4, a domain partitioning method 150 includes incorporating 152 a multi-port switch into a multi-mode computer system. Method 150 assigns 154 at least one port of the multi-port switch to one domain. Method 150 routes 156 transactions that are received by the multi-port switch and specify the first domain to one or more ports assigned to the first domain. Method 150 connects 158 nodes associated with the first domain to the ports assigned to the first domain.

Method 150 assigns 160 at least a second port of the multi-port switch to a second domain and routes 162 transactions that are received by the multi-port switch and specify the second domain to one or more ports assigned to the second domain. Method 150 connects 164 nodes associated with the second domain to ports assigned to that second domain.

Method 150 assigns 166 at least a third port of the multi-port switch to a third domain and routes 168 transactions which are received by the multi-port switch and specify the third domain to one or more ports assigned to the third domain. Method 150 connects 170 nodes associated with the third domain to ports assigned to the third domain.

Method 150 monitors 172 broadcast transactions generated for the first domain and transmits these broadcast transactions to only ports assigned to the first domain.

Method 150 maintains 174 the coherency of the cache memory for the first domain. Maintaining 174 the coherency includes monitoring 176 the caching of system memory by the nodes associated with the first domain and informing 178 the nodes requiring a cache update that the content of the system memory they have cached has changed.

Figure 5:
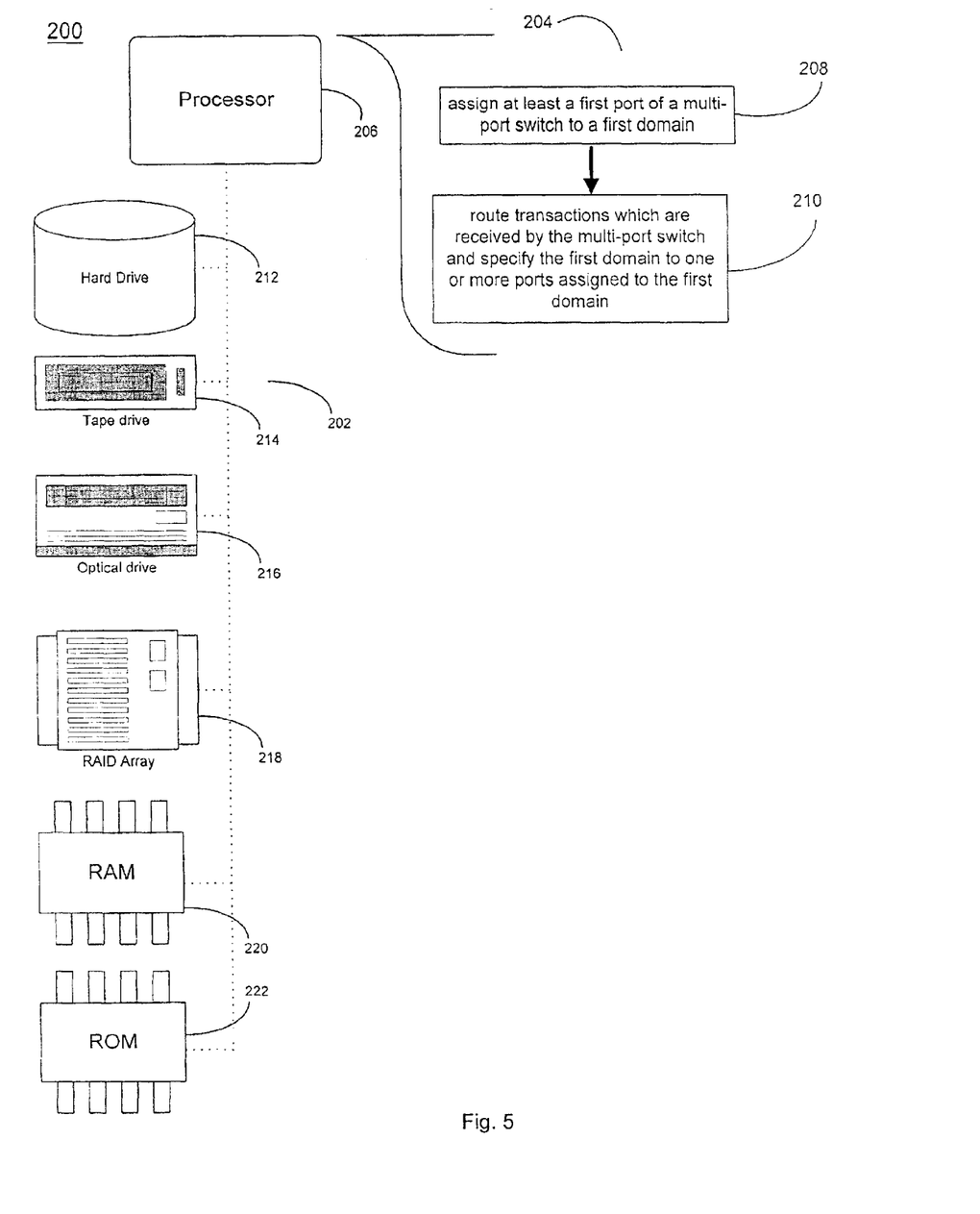
FIG. 5 shows another domain partitioning process.

Referring to FIG. 5, a computer program product 200 resides on a multi-domain computer system. Computer program product 200 includes a computer readable medium 202 for storing instruction 204 which, when executed by a processor 206, cause that processor 206 to assign 208 at least one port of a multi-port switch to a first domain. Computer program product 200 routes 210 transactions, which are received by the multi-port switch and specify the first domain, to one or more ports assigned to the first domain.

Embodiments of computer readable medium 202 may be: hard disk drive 212, tape drive 214; optical drive 216; RAID array 218; random access memory 220; and read only memory 222.

Figure 6:
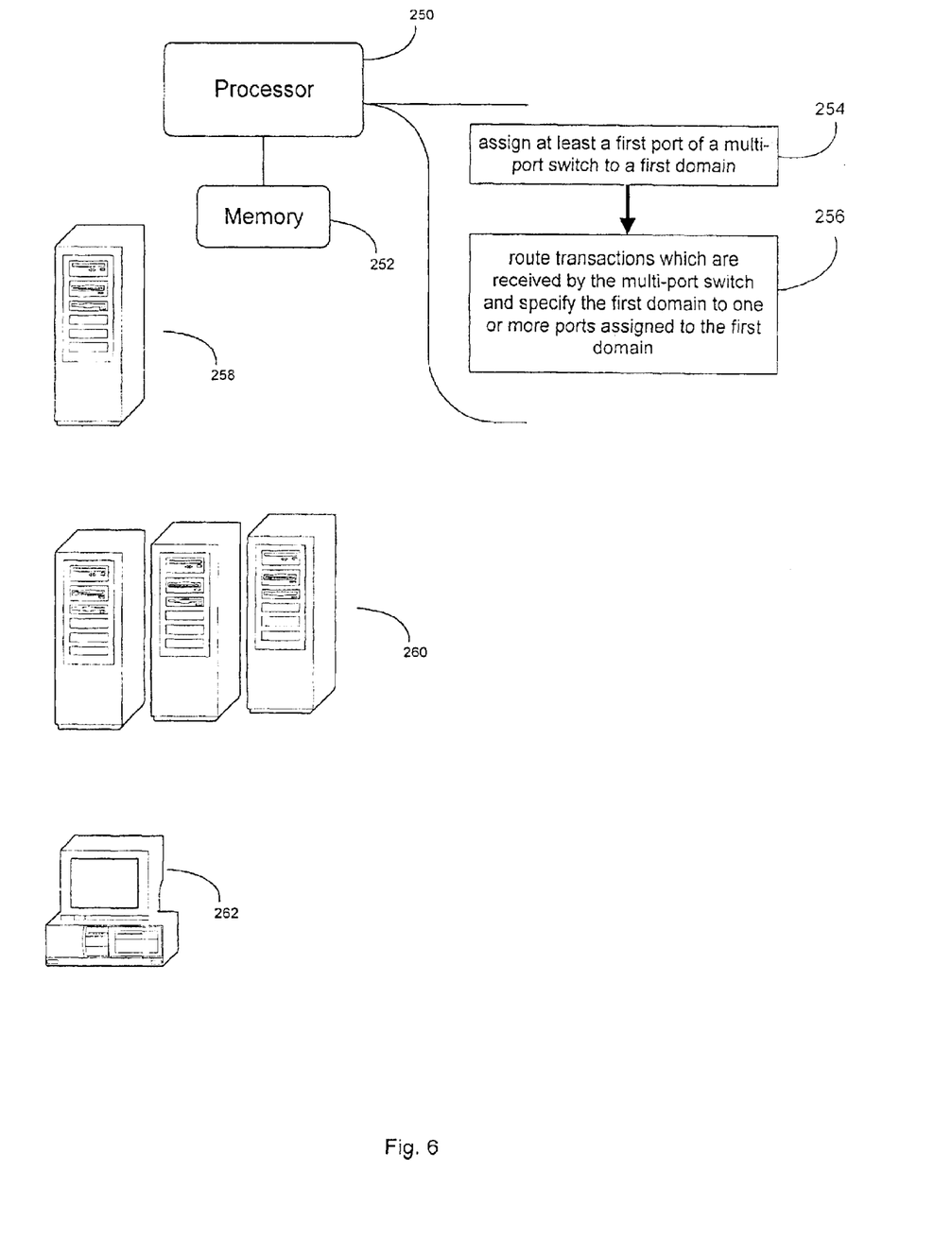
FIG. 6 shows another domain portioning process.

Referring to FIG. 6, a processor 250 and memory 252 are configured to assign 254 at least one port of a multi-port switch to a first domain. Processor 250 and memory 252 route 256 transactions, which are received by the multi-port switch and specify the first domain, to one or more ports assigned to the first domain.

Processor 250 and memory 252 may be incorporated into a network server 258, an array of network servers 260, or a workstation 262.

Other embodiments are within the scope of the following claims.

What is claimed is:

1. A method comprising:
   incorporating a multi-port switch into a multi-node computer system;
   assigning at least a first port of the multi-port switch to a first domain of the nodes;
   assigning at least a second port of the multi-port switch to a second domain of the nodes, the first domain of the nodes and the second domain having separate and independent memory structures
   delivering transactions that are received by the multi-port switch and are identified as associated with the first domain, to the at least a first or more ports assigned to the first domain;
   monitoring broadcast transactions generated for the first domain; and
   transmitting these broadcast transactions to only the at least a first or more ports assigned to the first domain.

2. The method of claim 1 further comprising:
   connecting nodes associated with the first domain to the at least a first port assigned to the first domain.

3. The method of claim 2 further comprising:
   maintaining a coherency of a cache memory for the first domain.

4. The method of claim 3 wherein said maintaining the coherency includes:
   monitoring a caching of system memory by the nodes associated with the first domain; and
   informing the nodes requiring a cache update that content of the system memory they have cached has changed.

5. The method of claim 1 further comprising:
   delivering transactions, which are received by the multi-port switch and are identified as associated with the second domain, to the at least a second or more ports assigned to the second domain.

6. The method of claim 1 further comprising:
   connecting nodes associated with the second domain to ports assigned to that second domain.

7. The method of claim 1 further comprising:
   assigning at least a third port of the multi-port switch to a third domain; and
   connecting nodes associated with the third domain to ports assigned to that third domain.

8. The method of claim 7 further comprising:
   delivering transactions, which are received by the multi-port switch and specify the third domain, to the at least a third or more ports assigned to the third domain.

9. A domain partitioning process for creating multiple domains in a multi-node computer system comprising:
   a first domain port assignment process for assigning at least a first port of a multi-port switch to a first domain;
   a second domain port assignment process for assigning at least a second port of the multi-port switch to a second domain of the nodes, the first domain of the nodes and the second domain of the nodes having separate and independent memory structures; and
   a first domain transaction routing process for routing transactions, which are received by said multi-port switch and specify the first domain, to one or more ports assigned to the first domain
   a broadcast partitioning process for monitoring broadcast transactions generated for the first domain and transmitting these broadcast transactions to only the one or more ports assigned to the first domain.

10. The domain partitioning process of claim 9 further comprising:
    a second domain transaction routing process for routing transactions, which are received by the multi-port switch and specify the second domain, to one or more ports assigned to the second domain.

11. The domain partitioning process of claim 9 further comprising:
    a third domain port assignment process for assigning at least a third port of the multi-port switch to a third domain.

12. The domain partitioning process of claim 11 further comprising:
    a third domain transaction routing process for routing transactions, which are received by the multi-port switch and specify the third domain, to one or more ports assigned to the third domain.

13. The domain partitioning process of claim 9 further comprising:
    a domain cache coherency process for monitoring the caching of system memory by the nodes associated with the first domain, and informing nodes requiring a cache update that the content of the system memory they have cached has changed.

14. A domain partitioning process for creating multiple domains in a multi-node computer system that includes a multi-port switch containing ports, the process comprising:
    a port assignment process for assigning at least a first port of said multi-port switch to a first one of a plurality of domains;
    a second port assignment process for assigning at least a second port of the multi-port switch to a second one of a plurality of domains, the first one of a plurality of domains and the second one of a plurality of domains having separate and independent memory structures; and
    a first domain transaction routing process for routing transactions, which are received by said multi-port switch and specify the first domain, to one or more ports assigned to the first domain
    a broadcast partitioning process for monitoring broadcast transactions generated for the first domain and transmitting these broadcast transactions to only the one or more ports assigned to the first domain.

15. The domain partitioning process of claim 14 further comprising:
 a transaction routing process for routing domain-specific transactions received by said multi-port switch to one or more ports assigned to the specified domain.

16. A computer program product residing on a computer readable medium having a plurality of instructions stored thereon which, when executed by a processor, cause that processor to:
 assign at least a first port of a multi-port switch to a first domain;
 assign at least a second port of the multi-port switch to a second domain, the first domain and the second domain having separate and independent memory structures;
 route transactions, which are received by the multi-port switch and specify the first domain, to one or more ports assigned to the first domain; and
 deliver transactions that are received by the multi-port switch and are identified as associated with the first domain, to the at least a first or more ports assigned to the first domain;
 monitor broadcast transactions generated for the first domain; and
 transmit these broadcast transactions to only the at least a first or more ports assigned to the first domain.

17. The computer program product of claim 16 wherein said computer readable medium is a read-only memory.

18. The computer program product of claim 16 wherein said computer readable medium is a hard disk drive.

19. A processor and memory configured to:
 assign at least a first port of a multi-port switch to a first domain;
 assign at least a second port of the multi-port switch to a second domain, the first domain and the second domain having separate and independent memory structures;
 route transactions, which are received by the multi-port switch and specify the first domain, to one or more ports assigned to the first domain;
 deliver transactions that are received by the multi-port switch and are identified as associated with the first domain, to the at least a first or more ports assigned to the first domain;
 monitor broadcast transactions generated for the first domain; and
 transmit these broadcast transactions to only the at least a first or more ports assigned to the first domain.

20. The processor and memory of claim 19 wherein said processor and memory are incorporated into a network server.

21. The processor and memory of claim 19 wherein said processor and memory are incorporated into a workstation.

22. A domain partitioning system comprising:
 a multi-port switch containing a plurality of ports;
 a IO hub controller connected to one of said ports;
 a scalable node controller connected to one of said ports; and
 at least one microprocessor connected to said scalable node controller; wherein
 the domain partitioning system is configured to include a first domain port assignment process for assigning at least a first port of said multi-port switch to a first domain;
 the domain partitioning system is configured to include a second domain port assignment process for assigning at least a second port of the multi-port switch to a second domain of the nodes, the first domain and the second domain having separate and independent memory structures;
 the domain partitioning system is configured to include a first domain transaction routing process for routing transactions, which are received by said multi-port switch and specify the first domain, to one or more ports assigned to the first domain; and
 the domain partitioning system is configured to include a broadcast partitioning process for monitoring broadcast transactions generated for the first domain and transmitting these broadcast transactions to only the one or more ports assigned to the first domain.

23. The domain partitioning system of claim 22 further comprising:
 a second domain transaction routing process for routing transactions, which are received by said multi-port switch and specify the second domain, to one or more ports assigned to the second domain.

* * * * *